United States Patent Office 2,931,834
Patented Apr. 5, 1960

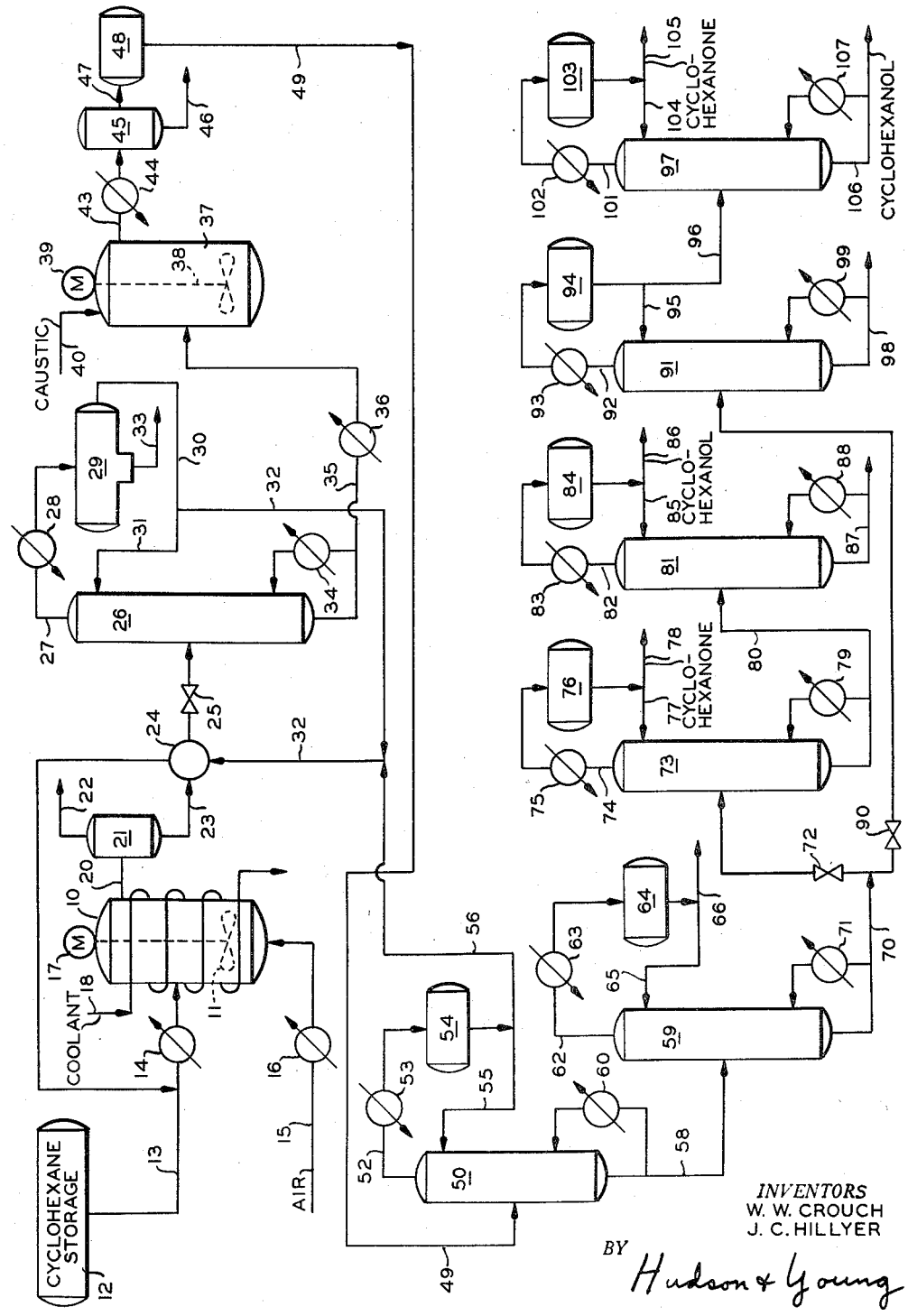

2,931,834

CYCLOHEXANE OXIDATION PROCESS

Willie W. Crouch and John C. Hillyer, Bartlesville, Okla., assignors to Phillips Petroleum Company, a corporation of Delaware Application September 13, 1956, Serial No. 609,692

13 Claims. (Cl. 260—586)

This invention relates to the production of cyclohexanol and cyclohexanone by the oxidation of cyclohexane.

It has been proposed to produce cyclohexanol and cyclohexanone by the oxidation of cyclohexane. These two products are of particular value as chemical intermediates. For example, caprolactam can be manufactured by reacting cyclohexanone with hydroxylamine to form cyclohexanone oxime, which can be rearranged to form caprolactam. Caprolactam can, in turn, be polymerized to form a nylon type product. Adipic acid can also be produced from cyclohexanone. This material has numerous uses.

However, the oxidation of cyclohexane to produce cyclohexanol and cyclohexanone has not been entirely successful heretofore. One of the chief difficulties has been the separation of the two desired products from the acids, esters, hydroperoxides and other materials which are formed by the oxidation reaction. Another problem results from the fact that the primary oxidation products, cyclohexanol and cyclohexanone, are more easily oxidized than the starting material, cyclohexane. Since acids have been found to catalyze the oxidation of the primary oxidation products to materials of higher oxygen content, methods such as utilizing caustic in the oxidation reactor to neutralize the acids have been employed. These procedures have not been entirely successful, however.

In accordance with the present invention, it has been discovered that cyclohexanone and cyclohexanol can be produced in high yields by a process which comprises oxidizing cyclohexane at a low conversion level per pass by a liquid phase oxidation process using air as the oxidizing agent. The reactor effluent is flashed to remove low-boiling acids, water formed by the oxidation, and most of the unreacted cyclohexane. The unreacted cyclohexane is separated from the volatile acids and recycled to the reactor. The concentrated oxygenated products remaining after the flash step are treated with an aqueous caustic solution. The organic phase is decanted from the custic treating step and the desired products are recovered by fractionation.

Accordingly, it is an object of this invention to provide an improved method of oxidizing cyclohexane.

Another object is to provide an improved method of separating cyclohexanol and cyclohexanone from the reaction products resulting from the air oxidation of cyclohexane.

Other objects, advantages and features of the invention should become apparent from the following detailed description which is taken in conjunction with the accompanying drawing which is a schematic representation of apparatus employed to carry out the method of this invention.

Referring now to the drawing in detail, there is shown a reactor 10 which is provided with a stirrer 11 that is driven by a motor 17. The cyclohexane to be oxidized is directed from a storage tank 12 through a conduit 13 and a heater 14 to the inlet of reactor 10. Air is directed through a conduit 15 and a heater 16 to a second inlet of reactor 10. It is desired that the cyclohexane be substantially free of aromatic hydrocarbons, such as benzene, because aromatic hydrocarbons resist oxidation and tend to accumulate in the system. A cyclohexane purity of at least 85% should be employed, with an aromatic concentration not greater than about 0.2 weight percent. An even higher purity is desirable. Reactor 10 should be maintained at a temperature in the range of 350 to 425° F. It is preferred that this temperature be maintained between 370 and 390° F. At temperatures below approximately 350° F., the oxidation reaction will not be sustained. If the temperature rises above approximately 425° F., the hydroperoxides resulting from the operation are thermally decomposed. This effect is undesirable at this stage of the process. The residence time of the cyclohexane in reactor 10 can be from 1 to 30 minutes. A residence time of from 2 to 10 minutes is preferred to obtain a maximum yield of cyclohexanol and cyclohexanone and to minimize the formation of by-products or secondary oxidation products such as acids, esters, aldols, acetals and the like.

The described conditions provide a conversion of from 1.0 to 5.0 weight percent of the cyclohexane charged to the reactor. It is preferred that conditions be maintained such that the conversion is from 1.0 to 3.0 weight percent. Higher conversion levels of cyclohexane should be avoided because they result in a lowering of the yield of the desired products, cyclohexanol and cyclohexanone. The conversion level depends primarily on the ratio of oxygen to hydrocarbon and on the residence time. Approximately 50 to 90 percent of the oxidized cyclohexane should be in the form of cyclohexyl hydroperoxide. The oxygen-containing gas which is delivered to reactor 10 by conduit 15 should not contain more than approximately 22 percent oxygen by volume, nor less than approximately 5 percent by volume. At higher concentrations of oxygen, the oxidation process is difficult, if not impossible, to control. If the oxidizing agent contains less than approximately 5 percent oxygen, the reaction is not sustained. Normal atmospheric air can be employed to advantage as the oxidizing agent. The oxygen in the off-gas from the reactor should be less than approximately 1.0 volume percent, and for optimum results should be less than approximately 0.2 volume percent. This insures that all of the oxygen present is utilized to oxidize the cyclohexane and is not available for subsequent oxidation of the products. The pressure in reactor 10 should be sufficient to keep the hydrocarbon in the liquid phase. Pressures in the range of 300 to 700 p.s.i.g. are advantageous, although higher pressures can be emloyed, if desired. Since the oxidation reaction is highly exothermic, reactor 10 is provided with a cooling coil 18 to prevent the temperature from rising above the desired value.

The primary advantage of operating within the above described conditions is that the short residence time and the relatively low temperatures do not cause decomposition of the resulting hydroperoxide. This minimizes the formation of secondary oxidation products and allows a major portion of the oxidation product to be withdrawn from reactor 10 in the form of the hydroperoxide.

The reactor effluent is directed through a conduit 20 to a liquid-gas separator 21. Gases, which comprise primarily nitrogen and carbon dioxide, are removed from separator 21 through a conduit 22. Liquid is withdrawn from separator 21 through a conduit 23 which contains a heat exchanger 24 and a valve 25 and is passed to the inlet of a fractionating column 26. Valve 25 is set to provide a substantial reduction in pressure of the effluent from reactor 10. The amount of material flashed by this pressure drop is adjusted so as to concentrate the desired oxygenated products in the kettle of column 26. The kettle product from column 26 should contain from 5 to 20 weight percent of oxygenated products. This flashing of the reactor effluent directly into fractionating column 26 serves to concentrate the oxygenated products, removes the water formed during oxidation, and removes practically all of the low boiling acids (primarily formic and acetic acid) formed by the oxidation. The flashing operation, plus the heat supplied by reboiler 34, removes a large portion of the unreacted cyclohexane, about 90 percent. It has been found that the small amount of water formed in reactor 10 is advantageous in that it helps to remove the low boiling acids by forming minimum boiling azeotropes therewith. The overhead from fractionating column 26 is directed through a conduit 27 and a condenser 28 to an accumulator 29. The liquid in accumulator 29 separates into an organic-cyclohexane phase and an aqueous phase which comprises a solution of water and low boiling acids. The cyclohexane is removed through a conduit 30 which communicates with conduits 31 and 32. Conduit 31 directs a portion of the cyclohexane back to column 26 as reflux. Conduit 32 passes through heat exchanger 24 and communicates with cyclohexane feed conduit 13 to recycle a portion of the cyclohexane to reactor 10. The water solution of low boiling acids is removed through a conduit 33. These acids can be disposed of as waste or recovered as additional products.

The kettle product from fractionating column 26 is removed through a conduit 35 which has a heater 36 therein and which communicates with the inlet of a treating vessel 37. A portion of the kettle product from column 26 is directed through a reboiler 34 and returned to the column. The kettle product from column 26 is treated in vessel 37 with a 5 to 15 percent aqueous solution of an alkali metal hydroxide, sodium hydroxide for example, which is directed into the vessel by a conduit 40. The amount of alkali metal hydroxide employed in this treatment is at least 75 percent of the sum of the saponification and total acidity equivalents, that is, 75 percent of the weight of alkali metal hydroxide required to neutralize the high boiling acids and saponify all the esters present in the oxygenated products-cyclohexane mixture. Under normal operating conditions, the amount of alkali metal hydroxide required is generally between 0.5 and 40 percent by weight of the hydroperoxides present in the mixture being treated. The temperature of vessel 37 is maintained between approximately 75 and 400° F., and the product being treated remains in the vessel from 1 to 40 minutes. This caustic treating step serves to form the alkali metal salts of the high boiling acids, to decompose the hydroperoxide, and to saponify the esters. A convenient method for controlling the amount of alkali metal hydroxide fed to treater 37 is to maintain the pH of the aqueous effluent from separator 45 above 12.5, preferably above 13.0. If the pH of this spent alkali metal hydroxide solution is maintained above 12.5, substantially all of the hydroperoxide is decomposed, the esters are saponified, and the high boiling acids are converted to the alkali metal salts.

The saponification of esters is particularly important because the yield of cyclohexanol is increased by recovering the cyclohexanol present in these esters. The caustic treatment also serves to remove esters which would be difficult to separate from cyclohexanol in the final purification steps, e.g., cyclohexyl formate. The decomposition of the hydroperoxide is, however, the primary function of the caustic treater because practically all of the cyclohexanol and cyclohexanone are present in the oxygenated products from the reactor in the form of the hydroperoxide. It should be observed that this caustic treating step is different from the procedures of the prior art wherein caustic is fed directly to the oxidation reactor. In accordance with the present invention, the oxygenated material is concentrated prior to the treatment with caustic. Furthermore, it has been found that the addition of caustic directly to the reactor tends to lower the yield of desired products and produces tars and gums within the reactor and the outlet conduits. The caustic treating step of the present invention further serves to convert the aldehydes present to high boiling polymers. These high boiling polymers can easily be removed in subsequent fractionation steps.

The effluent from treating vessel 37 is directed through a conduit 43 and a cooler 44 to a separator 45. An aqueous phase, which comprises water and dissolved alkali metal salts of high boiling acids, principally caproic acid, succinic acid, glutaric acid, and adipic acid, is withdrawn from separator 45 through a conduit 46. The organic phase from separator 45 is directed through a conduit 47 to an accumulator 48. The material in accumulator 48 is directed through a conduit 49 to the inlet of a fractionation column 50. The overhead vapors from column 50 are directed through a conduit 52 and a condenser 53 to an accumulator 54. Reflux is returned to column 50 by means of a conduit 55. The overhead product from column 50 comprises primarily cyclohexane. This cyclohexane is recycled to reactor 10 by means of a conduit 56 which communicates with recycle conduit 32. The kettle product from fractionation column 50 comprises a mixture of low boiling neutrals, high boiling neutrals, cyclohexanol and cyclohexanone. The high boiling neutrals are primarily $C_6$ and $C_7$ diols, and the low boiling neutrals are primarily aliphatic alcohols (primary, secondary, and tertiary). This mixture is directed through a conduit 58 to the inlet of a fractionation column 59. A portion of the kettle product from column 50 is returned to the column through a reboiler 60. The previously mentioned low boiling neutrals are removed as overhead product from column 59. The vapors from column 59 are directed through a conduit 62 and a condenser 63 to an accumulator 64. A portion of the condensed liquid is recycle by means of a conduit 65. The remainder is removed through an outlet conduit 66. The temperature in fractionation column 59 is maintained below approximately 250 to 275° F. to prevent the dehydration of the tertiary alcohols to unsaturated hydrocarbons. If dehydration does take place, the resulting unsaturated hydrocarbons appear in the kettle product. Since these materials have boiling points close to the boiling points of cyclohexanol, they are difficult to separate out in the final purification stages.

The kettle product from fractionation column 59, comprising high boiling neutrals, cyclohexanol and cyclohexanone, is removed from column 59 through a conduit 70. A portion of this kettle product is returned to column 59 through a reboiler 71. The kettle product from column 59 can further be separated by one of two methods, or by both. Conduit 70 communicates through a valve 72 with the inlet of a fractionation column 73. The overhead vapors from column 73 are directed through a conduit 74 and a condenser 75 to an accumulator 76. A portion of the condensed liquid is returned to column 73 through a reflux conduit 77. The remainder of the liquid is removed through a product conduit 78 and represents a cyclohexanone product stream. A kettle product from column 73 is removed through a conduit 80 to the inlet of a fractionation column 81. A portion of the kettle product is returned to column 73 through a reboiler 79. The overhead vapors from column 81 are directed through a conduit 82 and a condenser 83 to an accumulator 84. A portion of the resulting liquid is returned to column 81 through a reflux conduit 85. The remaining liquid represents a cyclohexanol product stream and is removed through a product conduit 86. A kettle product from column 81 is removed through a conduit 87. This product represents the high boiling neutrals. A portion of the kettle product is returned to column 81 through a reboiler 88.

Conduit 70 also communicates through a valve 90 with the inlet of a fractionation column 91. Column 91 is operated so that the overhead vapors comprise a mixture of cyclohexanol and cyclohexanone. These vapors are directed through a conduit 92 and a condenser 93 to an accumulator 94. A portion of the condensed liquid is returned to column 91 as reflux by means of a conduit 95. The remaining liquid is directed through a conduit 96 to the inlet of a fractionation column 97. The kettle product from column 91 comprises the high boiling neutrals. This product is removed through a conduit 98. The fluid mixture supplied to fractionation column 97 is separated into an overhead cyclohexanone stream and a kettle product cyclohexanol stream. The overhead vapors from column 97 are directed through a conduit 101 and a condenser 102 to an accumulator 103. A portion of the condensed liquid is returned to column 97 by a reflux conduit 104. The remaining liquid is removed through a product conduit 105. The cyclohexanol product is removed from the bottom of column 97 through a product conduit 106. Columns 91 and 97 are provided with respective reboilers 99 and 107.

Assuming complete recovery, the following material balance around the unit shown in the flow sheet is exemplary of the process.

| | Lb./hr. |
|---|---|
| Cyclohexane charge to reactor 10 | 100,000 |
| Portion of the charge represented by recycled cyclohexane | 98,000 |
| Fresh cyclohexane required | 2,000 |
| Conversion | 2,000 |
| Caustic required in caustic treater 37 | 226 |
| Water required to make up caustic solution | 2,034 |
| Products and by-products recovered: | |
| Low-boiling neutrals | 73 |
| High-boiling neutrals | 108 |
| High-boiling acids | 398 |
| Low-boiling acids | 102 |
| Cyclohexanol | 1270 |
| Cyclohexanone | 574 |
| Total | 2525 |

The following examples are exemplary of the process of this invention:

*Example I*

Cyclohexane was oxidized in a liquid-phase air-oxidation step in a continuous manner in a series of runs. The oxidation effluent was contacted, by the method of this invention, with an alkali metal hydroxide, this step also being carried out in a continuous manner.

In these runs, cyclohexane and air (approximately 20.8 percent oxygen) were fed continuously to a ½-gallon stirred stainless steel reactor, and the oxidation effluent was withdrawn continuously to a liquid-gas separator. The overhead line from this liquid-gas separator was fitted with a condenser so as to condense any cyclohexane or other volatiles which might be vaporized. The off-gas from the separator thus consisted almost entirely of nitrogen. The liquid from the liquid-gas separator was fed continuously to an 8-ft. by 4-inch inside diameter Pyrex distillation column which was packed with ½-inch Raschig rings. The reboiler for this column was a 2-inch pipe, Schedule 40, 304 stainless steel, approximately 15 inches long, and was fitted with a sight gauge, thermocouple wells, a drain, and 3–5 ampere electrical heaters. The overhead vapors from this column were condensed in a total condenser, fitted with a water-leg, a hydrocarbon outlet, and a vent to the overhead accumulator. The hydrocarbon phase in the overhead was then passed to an overhead accumulator, from which, part of the hydrocarbon was metered, preheated, and fed back to the top of the column as reflux. A reflux ratio of ½ to 1 was used. The major portion of the hydrocarbon was pumped to the suction side of the reactor feed pump and was recycled to the oxidation reactor.

The concentrated oxygenated product from the column reboiler was then fed to the continuous alkali metal hydroxide treater. Into this vessel, concentrated oxygenated product and 10 weight percent sodium hydroxide solution were supplied at a fixed rate. The caustic solution was metered in an amount to maintain the pH of the spent caustic phase at 12.5. The alkali metal hydroxide treater was operated at 50 p.s.i.g. to maintain the cyclohexane present in the liquid phase. The effluent from the caustic treater was passed into a liquid-liquid separator after passage through a heat exchanger and a back pressure regulator. The hydrocarbon phase was removed as overhead from this separator, while the spent aqueous caustic phase was withdrawn from the bottom of the separator.

The hydrocarbon phase was distilled, the overhead product comprising unreacted cyclohexane, low-boiling neutrals (primarily aliphatic alcohols), cyclohexanone, and cyclohexanol. The kettle product was high-boiling neutrals ($C_6$ and $C_7$ diols).

The spent aqueous caustic phase was made acidic with sulfuric acid, this acid treatment causing an oil layer to form. The layers were separated and the aqueous layer was distilled at atmospheric pressure. The overhead from the distillation consisting primarily of formic acid and acetic acid, was designated as low-boiling acids. The kettle product, primarily an aqueous solution of sodium sulfate, was extracted with acetone. The raffinate contained water and sodium sulfate. The extract was then distilled, and the kettle product was designated as high-boiling acids.

The oil phase from the acid treatment was distilled, and the kettle product was combined with the high-boiling acids. The overhead from this distillation comprised two layers, an oil layer and an aqueous layer. A sample of the oil layer was titrated with 0.2 N NaOH, and the weight of organic acid, assuming it to be caproic acid, was calculated. This weight was included in the total value reported for high-boiling acids. The difference between the weight of the oil layer and the weight of caproic acid was recorded as product, cyclohexanol. A sample of the weighed water layer was titrated with 0.2 N NaOH, and the weight of organic acid calculated as formic acid was determined. This weight was included in the total value reported for the low-boiling acids. The difference between the weight of the water layer and the weight calculated for formic acid was recorded as water formed during the run.

The following data clearly demonstrate the superiority of the present invention over previously known methods for producing cyclohexanol and cyclohexanone by the oxidation of cyclohexane. Of the following runs, runs 1, 2, 3 and 4 were carried out according to the above-described procedure, while runs 5 and 6 were carried out by passing the effluent from the autoclave directly to a liquid-gas separator. The liquid product from the separator was washed at 50–70° F. with one liter of 10 to 20 weight percent aqueous KOH, after which the aqueous layer was separated off. The hydrocarbon layer was distilled at a pressure of 20 mm. Hg absolute, and the material taken overhead was cyclohexanone, cyclohexanol, cyclohexane and light neutrals. The pot residue was considered to be heavy neutrals. The aqueous layer was neutralized with concentrated $H_2SO_4$ to a pH of 2.7, which caused an oil layer to separate out. In addition, $K_2SO_4$ precipitated. The oil layer was then flash distilled at 20 mm. Hg absolute pressure, and this distillation was carried out until the head temperature reached 100° C. The pot residue was considered to be heavy acids. The overhead consisted of two layers, an aqueous layer and an oil layer. The layers were then separated and weighed, and a sample of the oil layer was titrated with 0.2 N NaOH. It was assumed that the acid present in this layer was caproic acid, so the weight of caproic acid was calculated from the titration and added to the heavy acids. The difference between the oil layer and the caproic acid was recorded as cyclohexanol. The water layer was titrated with 0.2 N NaOH and the acid present was considered to be formic acid. This was reported as low-boiling acids.

As can be determined by an examination of the following experimental data, runs 1, 2, and 3 were carried out according to the method of the present invention, while runs 4, 5, and 6 illustrate the reduced yields which result when operating outside of the specified conditions of the present invention. In all of the runs, runs 1 through 6, the temperature and pressure conditions within the oxidation reactor are within the ranges of the present invention. However, in run 4, the oxygenated products were concentrated to 28.7 weight percent in the kettle of the fractionating column to which the reactor effluent was fed directly. For comparison, in runs 1, 2, and 3 the oxygenated products were concentrated to 14.6, 16.6, and 16.8 weight percent, respectively. Runs 5 and 6, while carried out according to the proper oxidation conditions, were not treated with an alkali metal hydroxide according to the method of this invention. The advantages of the present invention are best exemplified by the data given for ultimate yields in the following table. In runs 1, 2, and 3, the yields of cyclohexanone plus cyclohexanol was greater than 0.9 lb./lb. of cyclohexane consumed, while in runs 4 and 5, this value is below 0.85. Similarly, runs 6 (control) gave an ultimate yield of only 0.615 lb./lb. of cyclohexane consumed.

The following date summarized these runs:

|  | 1 | 2 | 3 | 4 | 5 | 6 |
|---|---|---|---|---|---|---|
| Temp., in Oxidation Reactor, °F | 380 | 380 | 380 | 380 | 353 | 400 |
| Pres. in Oxidation Reactor, p.s.i.g | 500 | 500 | 500 | 500 | 500 | 500 |
| Residence Time in Reactor, mins | 3.8 | 3.8 | 3.8 | 3.8 | 8.3 | 30.2 |
| Wt. Percent Cyclohexane Consumed/pass | 1.5 | 1.7 | 1.7 | 1.7 | 4.5 | 4.3 |
| Total Cyclohexane Consumed (Wt. Percent) | 8.2 | 10.4 | 10.5 | 16.7 | 4.5 | 4.3 |
| Length of Run, Hours | 43.75 | 36.167 | 36.167 | 5.5 | 0.83 | 2.85 |
| Mols Oxygen Consumed/100 mols of Cyclohexane Charged | 1.5 | 2.24 | 2.24 | 2.12 | 6.0 | 6.8 |
| Caustic Treater Temp., °F | 266 | 266 | 266 | 266 | Not treated |  |
| Residence time in Caustic Treater, minutes | 13.6 | 13.6 | 5.6 | 13.6 |  |  |

PRODUCTS DISTRIBUTION, WEIGHT PERCENT

| Run No. | Cyclohexanone +Cyclohexanol | High-Boiling Neutrals | Low-Boiling Acids | High-Boiling Acids | Low-Boiling Neutrals | $CO_2$ | $H_2O$ |
|---|---|---|---|---|---|---|---|
| 1 | 66.0 | 4.1 | 4.6 | 11.6 | 4.6 | 2.1 | 7.0 |
| 2 | 66.6 | 3.9 | 3.7 | 14.6 | 2.7 | 1.9 | 6.6 |
| 3 | 65.4 | 3.7 | 3.8 | 16.2 | 2.5 | 1.9 | 6.5 |
| 4 | 55.7 | 3.4 | 7.5 | 16.4 | 3.9 | 2.6 | 10.7 |
| 5 | 55.3 | 8.2 | 4.4 | 21.1 | (¹) | 2.6 | 8.4 |
| 6 | 38.5 | 16.8 | 6.1 | 18.5 | (¹) | 3.5 | 16.6 |

¹ In runs 5 and 6, the figures shown for cyclohexanone and cyclohexanol also include the low-boiling neutrals present.

ULTIMATE YIELD—LB./LB. CYCLOHEXANE CONSUMED

| Run No. | Cyclohexanone + Cyclohexanol | High-Boiling Neutrals | Low-Boiling Acids | High-Boiling Acids | Low-Boiling Neutrals | $CO_2$ | $H_2O$ |
|---|---|---|---|---|---|---|---|
| 1 | 0.914 | 0.057 | 0.064 | 0.160 | 0.064 | 0.029 | 0.098 |
| 2 | 0.917 | 0.054 | 0.051 | 0.199 | 0.037 | 0.026 | 0.091 |
| 3 | 0.905 | 0.052 | 0.053 | 0.224 | 0.035 | 0.026 | 0.088 |
| 4 | 0.835 | 0.051 | 0.113 | 0.248 | 0.060 | 0.040 | 0.062 |
| 5 | 0.828 | 0.124 | 0.066 | 0.317 | (¹) | 0.039 | 0.126 |
| 6 | 0.615 | 0.268 | 0.097 | 0.295 | (¹) | 0.056 | 0.265 |

¹ See footnote above.

Example II

Another oxidation run was carried out by the same procedure as described for runs 5 and 6 of Example I, except that instead of recovering the product after one pass through the reactor, the effluent from the reactor was recycled back through the reactor until the material had been fed through the reactor four times.

In this run, run 7, a mixture of air and oxygen containing 26–27% by volume oxygen was employed. Run 7 had to be discontinued because of heavy carbon formation in the reactor which started forming during the third pass.

While the invention has been described in conjunction with present preferred embodiments, it should be evident that it is not limited thereto.

What is claimed is:

1. The process for producing cyclohexanol and cyclohexanone which comprises contacting cyclohexane in the liquid state with a free oxygen containing gas in an oxidation zone; substantially reducing the pressure on the effluent from said oxidation zone to flash volatile acids, water and a major portion of the unreacted cyclohexane so that the material remaining contains from 5 to 20 weight percent of oxygenated products; contacting the thus concentrated oxygenated products remaining after the flashing step with an alkali metal hydroxide in a contacting zone; and recovering cyclohexanol and cyclohexanone from the contacting zone.

2. The process of claim 1 wherein the oxygen containing gas is air and the cyclohexane has a purity of at least 85% and contains not more than about 0.2 weight percent aromatics.

3. The process of claim 1 wherein the temperature in said oxidation zone is in the range of 370 to 390° F., and the residence time of the cyclohexane in the oxidation zone is from 2 to 10 minutes.

4. The process of claim 1 wherein the temperature in said oxidation zone is in the range of 350 to 425° F., the pressure in said oxidation zone is in the range of 300 to 700 pounds per square inch gauge, and the residence time of the cyclohexane in said oxidation zone is from 1 to 30 minutes.

5. The process of claim 1 wherein the amount of hydroxide employed is at least 75% of the total amount needed to saponify the esters and neutralize the acids present in the concentrated oxygenated products.

6. The process of claim 5 wherein the contacting zone is maintained at a temperature in the range of 75 and 400° F. and the residence time of the products therein is 1 to 40 minutes.

7. The process of claim 1 wherein approximately 2% of the cyclohexane passed to the contacting zone is oxidized, and wherein the oxygen containing gas is supplied at such a rate that the effluent gas from the contacting zone contains not more than 1.0 volume percent oxygen.

8. The process of claim 1 further comprising separating cyclohexane from the flashed material and returning same to the oxidation zone.

9. The process for producing cyclohexanol and cyclohexanone which comprises contacting cyclohexane in the liquid state with a free oxygen containing gas in an oxidation zone; removing gases from the effluent from said oxidation zone; substantially reducing the pressure on said effluent from said oxidation zone and passing the effluent to a frictionation zone; removing volatile acids, water and a major portion of the unreacted cyclohexane from the top of said fractionation zone; removing an oxygenated product stream from the bottom of said fractionation zone which contains from 5 to 20 weight percent of oxygenated products and passing same to a contacting zone; adding an aqueous caustic solution to said contacting zone; separating the effluent from said contacting zone into an aqueous phase and an organic phase; and recovering cyclohexanol and cyclohexanone from the organic phase.

10. The process of claim 9 further comprising separating the cyclohexanol and cyclohexanone from one another.

11. The process for producing cyclohexanol and cyclohexanone which comprises contacting cyclohexane of at least 85% purity and containing not more than about 0.2 weight percent aromatics with air in an oxidation zone that is maintained under sufficient pressure to maintain the cyclohexane in the liquid state; maintaining the temperature in said oxidation zone in the range of 370 to 390° F.; retaining the cyclohexane in said oxidation zone for a period of 2 to 10 minutes; substantially reducing the pressure on the effluent from said oxidation zone to flash volatile acids, water and a major portion of the unreacted cyclohexane so that the material remaining contains from 5 to 20 weight percent of oxygenated products; contacting the thus concentrated oxygenated products remaining after the flashing step with an aqueous caustic solution in a contacting zone, the amount of caustic employed being at least 75% of the amount needed to saponify the esters present; and recovering cyclohexanol and cyclohexanone from the contacting zone.

12. The process for producing cyclohexanol and cyclohexanone which comprises contacting cyclohexane of at least 85% purity and containing not more than about 0.2 weight percent aromatics with air in an oxidation zone that is maintained at a pressure in the range of 300 to 700 pounds per square inch gauge; maintaining the temperature in said oxidation zone in the range of 350 to 425° F.; retaining the cyclohexane in said oxidation zone for a period of 1 to 40 minutes; substantially reducing the pressure on the effluent from said oxidation zone to flash volatile acids, water and a major portion of the unreacted cyclohexane so that the material remaining contains from 5 to 20 weight percent of oxygenated products; contacting the thus concentrated oxygenated products remaining after the flashing step with an aqueous caustic solution in a contacting zone, the amount of caustic employed being at least 75% of the amount needed to saponify the esters present; and recovering cyclohexanol and cyclohexanone from the contacting zone.

13. The process of claim 9 further comprising passing said volatile acids, water and major portion of the unreacted cyclohexane from the top of said fractionation zone through a condensing zone to an accumulation zone; passing a portion of the unreacted cyclohexane from said accumulation zone to said fractionation zone as reflux; and passing a portion of the unreacted cyclohexane from said accumulation zone back to said oxidation zone.

References Cited in the file of this patent

UNITED STATES PATENTS

| | | |
|---|---|---|
| 2,410,642 | Farkas et al. | Nov. 5, 1946 |
| 2,552,670 | Fleming | May 15, 1951 |
| 2,609,395 | Dougherty et al. | Sept. 2, 1952 |
| 2,615,921 | Dougherty et al. | Oct. 28, 1952 |